US006458314B1

(12) United States Patent
Al Ghatta

(10) Patent No.: US 6,458,314 B1
(45) Date of Patent: *Oct. 1, 2002

(54) PROCESS FOR THE DIMENSIONAL STABILIZATION OF CONTAINERS IN POLYETHYLENE TEREPHTHALATE

(75) Inventor: Hussain Al Ghatta, Fiuggi (IT)

(73) Assignee: Sinco Ricerche S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 47 days.

(21) Appl. No.: 09/091,528

(22) PCT Filed: Oct. 15, 1997

(86) PCT No.: PCT/EP97/05661

§ 371 (c)(1),
(2), (4) Date: Jul. 14, 1999

(87) PCT Pub. No.: WO98/17706

PCT Pub. Date: Apr. 30, 1998

(30) Foreign Application Priority Data

Oct. 18, 1996 (IT) .......................................... MI96A2159

(51) Int. Cl.$^7$ ........................ B29D 22/00; B29B 17/00; B29C 71/00
(52) U.S. Cl. ........................ 264/537; 264/345; 264/900

(58) Field of Search .............................. 428/35.7, 36.9, 428/36.92, 480; 264/521, 519, 234, 345, 340, 537, 538, 900, 901

(56) References Cited

U.S. PATENT DOCUMENTS

| 4,665,682 A | | 5/1987 | Kerins et al. .................. 53/452 |
| 5,310,857 A | * | 5/1994 | Jones et al. .................. 528/220 |
| 5,376,734 A | * | 12/1994 | Al Ghatta .................... 525/437 |
| 5,393,862 A | | 2/1995 | Jones et al. .................. 528/298 |
| 5,444,144 A | | 8/1995 | Tanaka et al. ............... 528/503 |

FOREIGN PATENT DOCUMENTS

| EP | 752 437 A2 | 1/1997 |
| WO | WO 93/08226 | 4/1993 |

* cited by examiner

*Primary Examiner*—Harold Pyon
*Assistant Examiner*—Michael C. Miggins
(74) *Attorney, Agent, or Firm*—Cook, Alex, McFarron, Manzo, Cummings & Mehler, Ltd.

(57) ABSTRACT

Treatment for the dimensional stabilization of containers in PET or COPET obtained by injection-blow molding consisting in subjecting to beat treatment during the blowing phase, preforms obtained from PET or COPET upgraded in the solid state in the presence of small quantities (0.01–0.2% by weight) of a dianhydride of an aromatic tettacarboxylic acid, preferably pyromellitic dianhydride.

2 Claims, No Drawings

PROCESS FOR THE DIMENSIONAL STABILIZATION OF CONTAINERS IN POLYETHYLENE TEREPHTHALATE

BACKGROUND OF THE INVENTION

The present invention is directed to an improved process for the stabilization of heat deformation in polyethylene terephthalate containers obtained by the injection blow-molding technique.

It is known that containers (bottles) in PET obtained by injection blow molding are subject to deformation. In addition, they are subject to deformation of a considerable extent when they are employed under high temperature conditions such as those which occur during hot-filling and sterilization operations.

The temperature of such treatments can reach 80°–90° C. and the material tends to soften and shows shrinkage once cooled, with a volume reduction which can reach 15–250%.

With the aim of reducing or eliminating such inconveniences, the preforms of the containers obtained by injection molding are subjected to heat stabilization treatment (heat-setting), which is carried out during the blowing phase of the preform.

The treatment temperature is higher than 130° C. and generally is between 130° and 180° C. with a duration of is a few seconds. The preforms thus obtained give the desired dimensional heat set qualities to the containers.

During the treatment, however, olygomers are formed which lead to fouling of the mold, and consequently, the necessity of cleaning it and therefore frequent interruptions in the production cycle.

It has now been found that it is possible to reduce or diminish the precipitation of olygomers in the preform blow molds and therefore to be able to operate with production cycles which do not require mold cleaning operations. This can be achieved by subjecting to heat setting, preforms obtained from polyethylene terephthalate (PET) or its copolymers (COPET), in which up to 15% by moles of units deriving from terephthalic acid are substituted by units deriving from isophthalic acid and/or naphthalene dicarboxylic acid, previously subjected to upgrading or polycondensation in the solid state (SSPA) in the presence of small percentages of a dianhydride of an aromatic tetracarboxylic acid.

Pyromellitic dianhydride is the preferred dianhydride. The dianhydrides are employed in quantities from 0.01 to 0.2% by weight, preferably 0.04–0.1%.

The polycondensation treatment in the solid state is conducted at temperature generally between 180° and 220° C. for sufficient time to increase the intrinsic viscosity of the polymer to the desired value.

The dianhydride is added to the PET or COPET in the melt state. It is convenient to dissolve it in ethylene glycol.

It was found that, employing upgraded PET and COPET as above indicated, the heat treatment of the preforms can be carried out at temperatures notably lower than those employed in the hitherto known processes. The heating temperatures of the preform blow mold are between 80° and 130° C. and are sufficient on confer to the containers the necessary dimensional stability. Operating under such heating conditions, mold fouling phenomena do not occur.

The duration of the treatment is of a few seconds, generally less than 10 seconds.

The container thus obtained is cooled in air, after extraction from the mold.

The preform enters the preheated mold at temperatures between 100° and 140° C.

The stabilized containers obtained in this way. are suitable for applications such as hot-filling.

The following examples are provided to illustrate but not to limit the invention.

EXAMPLE 1

20 kg/h of PET (IV=0.57 dl/g) are fed continuously from the melt polycondensation section of a PET production pilot plant to a counter-rotating non-intermeshing twin screw extruder equipped with a degassing system.

To the extruder are fed 40 g/h of a mixture of crystalline PET containing 20% in weight of PMDA, equal to a quantity of PMDA in the PET of 0.04% by weight.

The test conditions were:

| | |
|---|---|
| screw speed | 500 rpm |
| L/D ratio of the screw | 48 |
| cylinder temperature | 282° C. |
| temperature of melt product | 298–302° C. |
| average residence time | 35–50 sec |

The product was extruded in the form of chips of diameter 5 mm and 5 mm length. The IV was 0.62 dl/g.

The granules were then subjected to SSP in a continuous pilot plant operating as follows:

| | |
|---|---|
| chip flow | 50 kg/h |
| average temp. of chips in reactor | 203° C. |
| weight ratio gas/chips in reactor | 1:1 |
| final intrinsic viscosity | 0.828 dl/g |

COMPARISON EXAMPLE 1

The polymer obtained according to Example 1 is transformed, after drying, into preforms using an injection molding machine BMB 270 with the following procedure:

| | |
|---|---|
| mold | with 16 cavities |
| preform weight | 46.9 g |
| cycle time | 21 sec |
| screw temperature | 273° C. |
| feeding time | 10 sec |
| injection time | 5 sec |
| cooling water temperature | 3° C. |

The preforms thus obtained are blown into bottle form using a Krupp Corpoplast blow molding machine.

Conditions were the following:

| | |
|---|---|
| bottle production | 6.000 bottles/h |
| temperature of heating elements | 100° C. |
| blowing pressure | 35 bar |
| bottle volume | 1.500 cm$^3$ |

EXAMPLE 2

Preforms obtained from the granules obtained according to Example 1 were blown in a machine having molds equipped with a heating system. The temperature of the mold was 120° C. with a duration of treatment of 5 seconds, after which the preforms were cooled in air. The starting temperature of the preform in the mold was 100° C. No fouling of the molds was noted during the entire production cycle.

EXAMPLE 3

The bottles of Example 2 and those of Comparison Example 1 were subjected to the following temperature conditions:

| | |
|---|---|
| 50° C. | 6 h |
| 85° C. | 2 min |
| 90° C. | 2 min |
| 95° C. | 2 min |
| 95° C. | 10 min |

The dimensional variations of the bottles are reported in Table 1.

The tests at 85°, 90° and 95° C. were carried out on bottles aged in water at 50° C. for 6 hours.

TABLE 1

EXAMPLE 2

| | Bottle - 1 | | Bottle - 2 | | | Bottle - 3 | | |
|---|---|---|---|---|---|---|---|---|
| Treatment | Before | After 6 h. at 50° C. | Before | After 2 min. at 85° C. | After 2 min. at 95° C. | Before | After 2 min. at 90° C. | After 10 min. at 95° C. |
| net weight (g) | 46.8 | 46.8 | 46.8 | 46.8 | 46.8 | 47.1 | 47.1 | 47.1 |
| volume H$_2$O (cm$^3$) | 1572.3 | 1570.9 | 1572.5 | 1571.7 | 1543 | 1574.2 | 1572.8 | 1550.2 |
| neck diameter (mm) | 27 | 27 | 27 | 27 | 27 | 27 | 27 | 27 |
| centre diameter (mm) | 80 | 80 | 80 | 80 | 80 | 80 | 80 | 80 |
| bottom diameter (mm) | 92.5 | 92.5 | 92.5 | 92.5 | 90.5 | 92.5 | 92 | 90.5 |
| height (mm) | 308 | 308 | 309 | 309 | 31.05 | 308 | 308 | 310 |
| percentage variation after treatment | 0 | -0.09 | 0 | -0.05 | -1.88 | 0 | -0.09 | -1.52 |

| | Bottle-1 | | Bottle-2 | |
|---|---|---|---|---|
| Treatment | Before | After 2 min. at 85° C. | Before | After 2 min. at 85° C. |
| net weight (g) | 47.1 | 47.1 | 47 | 47 |
| volume H$_2$O (cm$^3$) | 1574.8 | 1344 | 1574.1 | 1557.2 |
| neck diameter (mm) | 27 | 27 | 27 | 27 |
| center diameter (mm) | 81 | 79 | 80 | 78.9 |
| bottom diameter (mm) | 92.5 | 89 | 92.5 | 89 |
| height (mm) | 308 | 291 | 308 | 288 |
| variation % after treatment | 0 | −14.4 | 0 | −15 |

What is claimed is:

1. A process for heat-setting against dimensional heat deformation injection blow-molded containers from polyester resins, wherein injected preforms are obtained from polyethyleneterephthalate or copolyethyleneterephthalates containing up to 20% by mols of units deriving from an acid selected from the group consisting of isophthalic acid, a naphtalene dicarboxylic acid and a combination of both, upgraded in the solid state in the presence of from 0.01 to less than 0.1 wt % of a dianhydride of an aromatic tetra-carboxylic acid and the obtained preforms are heat treated for less than 10 seconds at temperatures from 80° to less than 130° C. in a mold used for blowing the preforms.

2. The process according to claim 1 wherein the dianhydride is pyromellitic dianhydride in a quantity from 0.04–0.01% by weight.

* * * * *